US006799771B2

(12) United States Patent
Bigot

(10) Patent No.: US 6,799,771 B2
(45) Date of Patent: Oct. 5, 2004

(54) FOLDING BICYCLE

(75) Inventor: Henri Bigot, Creteil (FR)

(73) Assignee: BeGo Production, Beni-Khiar (TN)

( * ) Notice: Subject to any disclaimer, the term of this patent is extended or adjusted under 35 U.S.C. 154(b) by 0 days.

(21) Appl. No.: 10/451,391

(22) PCT Filed: Dec. 6, 2001

(86) PCT No.: PCT/FR01/03859

§ 371 (c)(1),
(2), (4) Date: Jun. 23, 2003

(87) PCT Pub. No.: WO02/051697

PCT Pub. Date: Jul. 4, 2002

(65) Prior Publication Data

US 2004/0032110 A1 Feb. 19, 2004

(30) Foreign Application Priority Data

Dec. 27, 2000 (FR) .............................. 00 17096

(51) Int. Cl.[7] .............................................. B62K 1/00
(52) U.S. Cl. ...................................... 280/278; 280/287
(58) Field of Search ................................. 280/278, 287

(56) References Cited

U.S. PATENT DOCUMENTS

| 3,623,749 | A | * | 11/1971 | Jensen | ........................ 280/278 |
| 4,111,447 | A | * | 9/1978 | Ishida | ........................ 280/278 |
| 4,132,428 | A | * | 1/1979 | Lassiere | ..................... 280/278 |
| 4,182,522 | A | * | 1/1980 | Ritchie | ....................... 280/278 |
| 4,448,435 | A | * | 5/1984 | Hon | ........................... 280/278 |
| 4,448,437 | A | * | 5/1984 | Montague | ................... 280/287 |
| 4,634,138 | A | * | 1/1987 | Fryer et al. | ................. 280/278 |
| 4,824,130 | A | * | 4/1989 | Chiu | .......................... 280/239 |
| 5,398,955 | A | * | 3/1995 | Yeh | ............................ 280/287 |
| 5,785,338 | A | * | 7/1998 | Chang | ........................ 280/278 |
| 6,702,312 | B1 | * | 3/2004 | Miksik | ....................... 280/287 |

FOREIGN PATENT DOCUMENTS

| EP | 0 296 633 | 12/1988 |
| WO | WO 99/38759 | 8/1999 |

OTHER PUBLICATIONS

Patent Abstracts of Japan, vol. 1995, No. 11, Dec. 26, 1995 & JP 07 205864 A (Daikin MFG Co Ltd), Aug. 8, 1995 abstract.
Patent Abstracts of Japan, vol. 1995, No. 11, Dec. 26, 1995 & JP 07 205863 A (Daikin MFG Co Ltd), Aug. 8, 1995 abstract.

* cited by examiner

Primary Examiner—Lesley D. Morris
Assistant Examiner—L. Lum
(74) Attorney, Agent, or Firm—Young & Thompson

(57) ABSTRACT

A folding bicycle comprises a frame including a front part whereon is mounted pivoting a steering rod having a lower end provided with a first wheel and an upper end provided with a handlebar, a rear part whereon is mounted a second wheel, and a central part whereon are mounted a saddle and a crankset connected to the rear wheel by transmission elements, such that the saddle, the crankset, the steering rod, the front wheel and the rear wheel are substantially contained in a common plane when the bicycle is unfolded. The frame includes elements articulating the front part and the rear part to the central part to reduce the bicycle wheelbase associated with elements for maintaining at least the front wheel and the rear wheel in the plane.

10 Claims, 5 Drawing Sheets

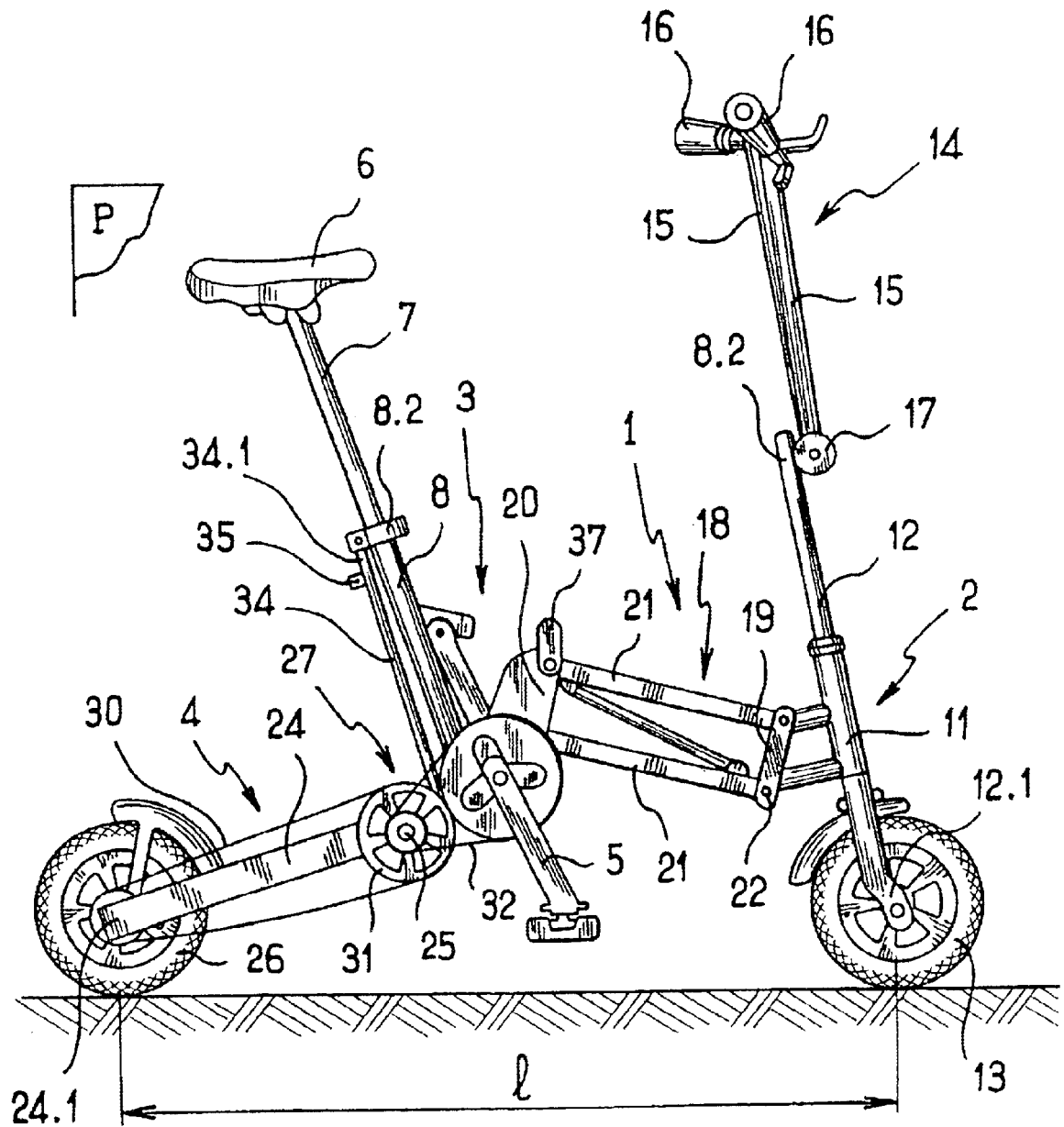
FIG_1

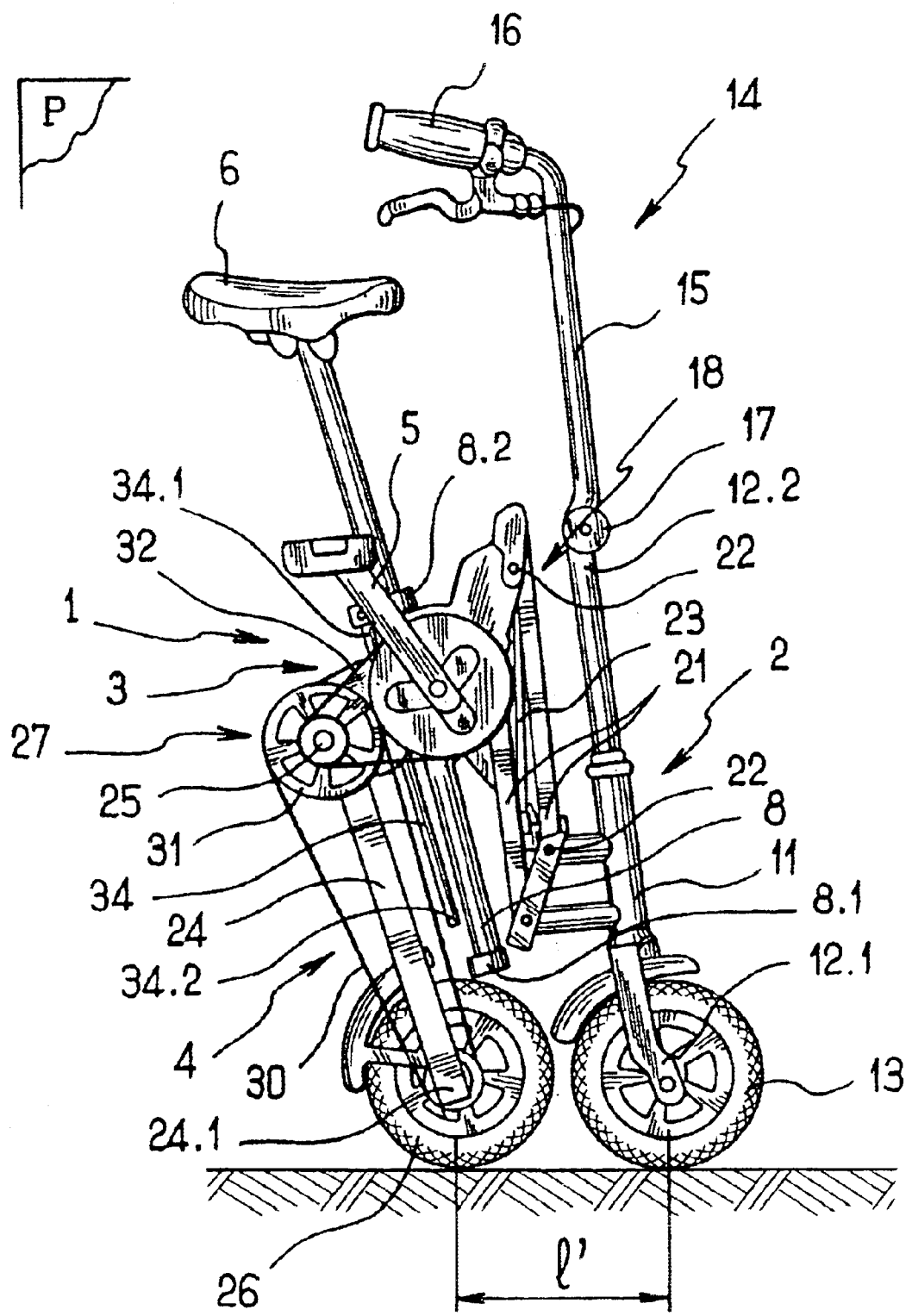
FIG_2

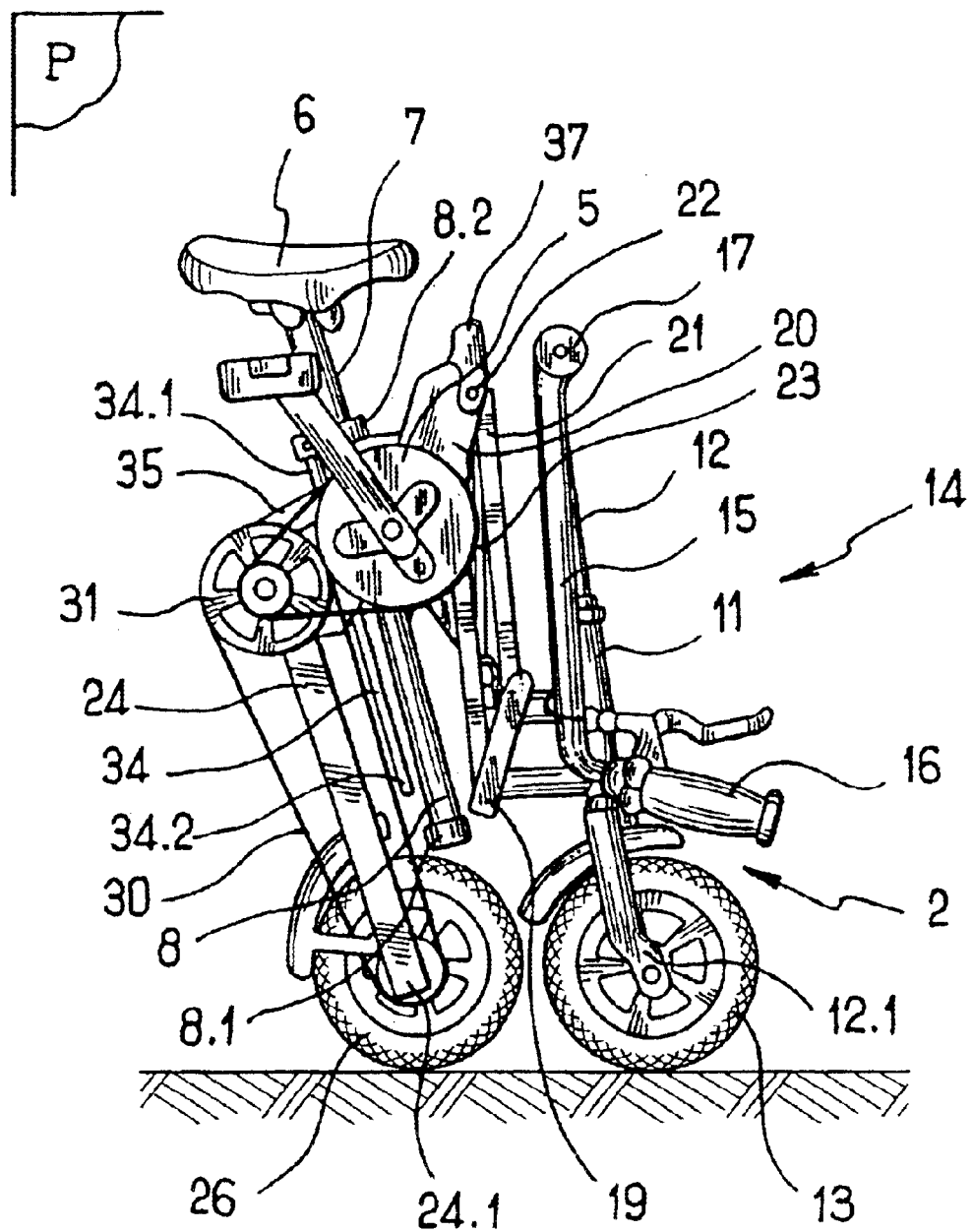
FIG_3

FIG._4

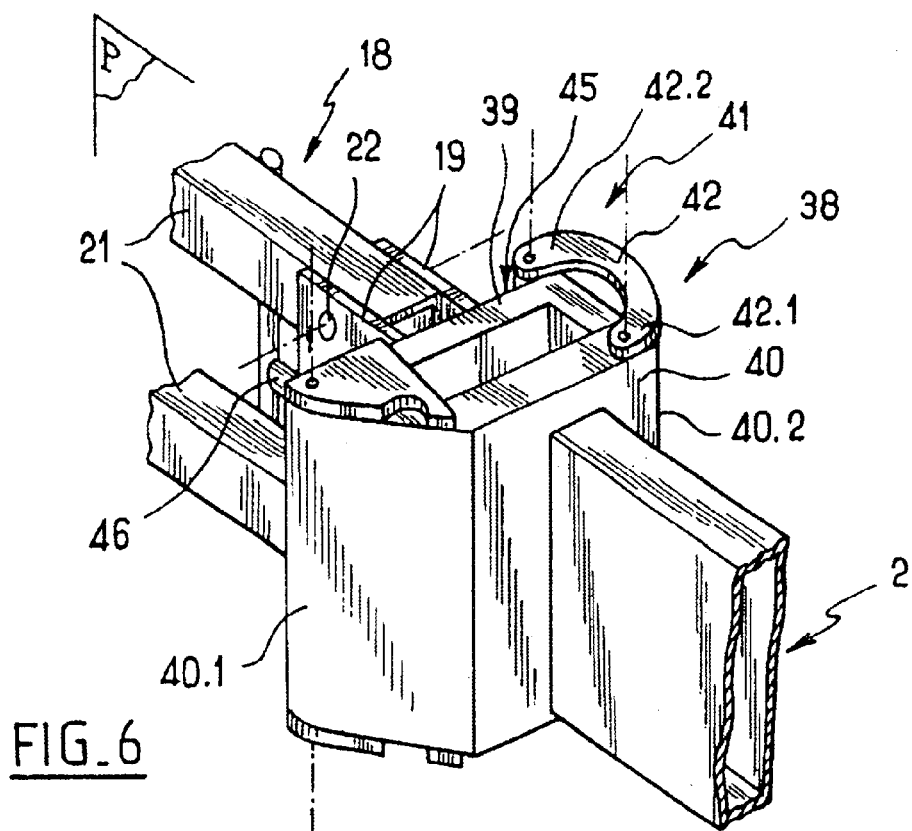
FIG_6
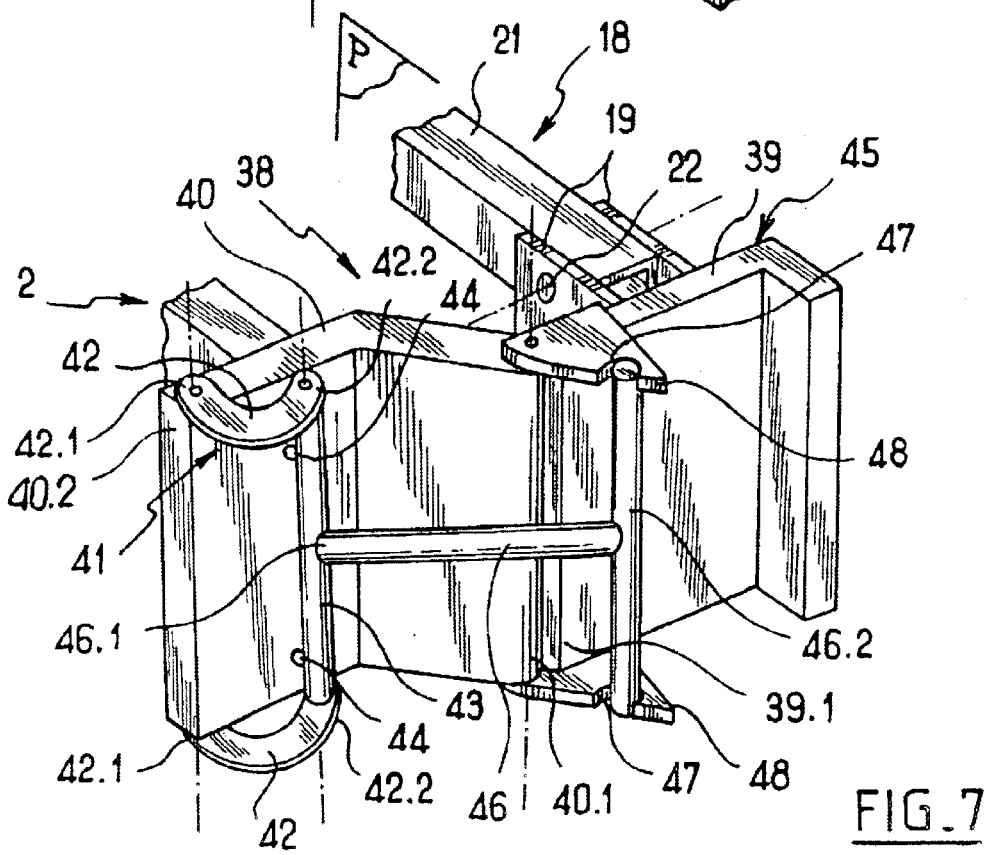
FIG_7

FOLDING BICYCLE

BACKGROUND OF THE INVENTION

The present invention relates to a folding bicycle.

Numerous bicycle structures exist that enable the bicycle to be folded in such a manner as to reduce the size of the bicycle when not in use and make it easier to stow.

All such bicycles comprise a frame having a front portion on which a steering post is pivotally mounted with a bottom end provided with a first wheel and a top end provided with handlebars, a rear portion on which a second wheel is mounted, and a central portion having mounted thereon a seat and a pedal unit connected to the rear wheel by transmission means.

In the unfolded state, and regardless of the structure of the bicycle in question, the seat, the pedal unit, the steering post, the front wheel, and the rear wheel are all contained in a common plane, and the bicycle presents a wheelbase (i.e. the distance between its front and rear wheels) that is long enough to enable it to provide the stability needed for it to be used as a means of transport.

In contrast, the disposition of the elements constituting the bicycle when in the folded state differs depending on the bicycle structure under consideration.

Documents EP-A-0 323 964 and GB-A-2 021 055 disclose bicycles having wheels that extend substantially side by side when the bicycle is in its folded state. That configuration is advantageous because it is compact. However it requires the frame to present elements that are connected to one another by hinges with axes that are not parallel, such that making the structure of such bicycles is relatively complicated. Folding and deploying the bicycle are not always easy, in particular because of the complexity of the maneuvers that need to be performed. In addition, once the bicycle is folded, it is generally necessary to carry it, and that can be difficult in particular because of the weight of the bicycle.

Document EP-A-0 388 540 discloses a bicycle in which the wheels extend one behind the other when the bicycle is in the folded state. Nevertheless, in that case also, the structure of the bicycle is relatively complex. In addition, given the arrangement of the component parts of the bicycle once it has been folded, the only way of transporting the folded bicycle is to carry it.

Thus, with a folded bicycle of known type, a user entering a pedestrian zone (whether a pedestrianized street or inside covered premises such as a shop) must either push the bicycle in an unfolded state beside the user where, given its length and poor maneuverability, it runs the risk of getting in the way of other pedestrians, particularly in areas that are very crowded, or must leave the bicycle outside the pedestrian area in which case the user runs the risk of having it stolen, or else must fold the bicycle and then carry it in order to access the pedestrian area, in which case the user is hindered in moving about and is likely to tire quickly.

Folding bicycles are also known comprising a frame having a front portion on which a steering post is mounted, the steering post having a bottom end provided with a first wheel and a top end provided with handlebars, a central portion on which a seat and a pedal unit are mounted, and a rear portion which comprises an arm having a first end on which a second wheel is mounted, the second wheel being connected to the pedal unit by transmission means, and an opposite, second end connected to the central portion by a hinge so that the rear wheel is movable between a spaced-apart position and a close-together position relative to the front wheel. Thus, it is possible to reduce the wheelbase of the bicycle while keeping the front and rear wheels in the plane of the bicycle so that the bicycle can still run and be guided by a user pushing it from the side. It is then easier for the user to penetrate into pedestrian areas while pushing the bicycle without hindering other people present in the pedestrian area because of the short wheelbase of the bicycle. Nevertheless, handling and locking the bicycle in its various positions turn out to be relatively complex.

OBJECTS AND SUMMARY OF THE INVENTION

An object of the invention is to propose a folding bicycle of the above type which is simpler in structure, enabling the operations of folding and deploying to be performed easily and quickly.

In order to achieve this object, the folding bicycle comprises a seat secured to a post slidably received in a sheath mounted on the central portion to slide between an in-use position in which the seat is remote from the pedal unit and a shoulder surface of the sheath is in abutment beneath the central portion, and a stowage position in which the seat is adjacent to the pedal unit, and the sheath has means for locking the arm in the spaced-apart position, which means are arranged to cooperate with the second end of the arm and oppose movement of the sheath towards its stowage position when the sheath is in its in-use position.

Handling the sheath enables the wheel to be locked in the spaced-apart position so that locking can be performed simply and quickly. The locking means perform two functions, namely: preventing the rear wheel from moving away from its spaced-apart position; and keeping the sheath in its in-use position, thus providing a structure that is simple. In addition, the use of a sliding sheath for the seat post makes it possible for the bicycle in the folded state to have a structure that is compact.

Preferably, the second end of the arm has an arm abutment surface beyond the hinge for coming into abutment against a corresponding surface of the central portion to define the spaced-apart position of the rear wheel, and the bicycle includes a rod for locking the arm in the spaced-apart position, the locking rod having one end mounted on the sheath to pivot when the sheath is in its in-use position between a locked position in which the opposite end of the locking rod bears against the second end of the arm to press the abutment surface against the corresponding surface of the central portion, and an unlocked position in which the opposite end of the locking rod is retracted relative to the second end of the arm.

While the bicycle is in an unfolded state, the locking rod then performs two functions, namely: locking the arm in the spaced-apart position; and keeping the sheath in the in-use position. The bicycle is folded by retracting the free end of the locking rod so as firstly to release the second end of the arm, thereby allowing it to return to the close-together position, and secondly enabling the sheath to move into the stowage position.

Also advantageously, the locking rod is provided at its end mounted on the sheath with a stop for co-operating with the second end of the arm when the sheath is in its stowage position and the arm is in its close-together position, so as to oppose displacement of the arm towards its spaced-apart position.

It is then particularly simple to lock the arm in its two positions.

In a particular embodiment, the front portion and the central portion of the frame are connected together by a deformable parallelogram having hinges with axes substantially perpendicular to said plane, and the rear portion is mounted on the central portion by a hinge with an axis substantially perpendicular to said plane in such a manner that the wheels are movable relative to each other between a spaced-apart position corresponding to the bicycle being in its unfolded state, and a close-together position beneath the pedal unit corresponding to the bicycle being in a folded state.

The bicycle can then be folded simply and quickly by raising the central portion of the frame so as to cause the wheels to fold under the pedal unit. The structure of the bicycle is also relatively simple.

According to a particular characteristic, the bicycle includes a synchronizing rod for synchronizing the movements of the front and rear portions, the synchronizing rod having one end fixed to the deformable parallelogram, and one end fixed to the second end of the arm.

This simplifies handling by coordinating the movements of the front and rear portions.

According to another particular characteristic, the transmission means include an intermediate pair of chain wheels mounted to rotate about the hinge axis between the rear portion and the central portion of the frame, and connected both to the pedal unit to be driven thereby, and to the rear wheel in order to drive it.

When the transmission is implemented by means of flexible connections such as chains or belts, the use of an intermediate pair of chain wheels, or the like, enables the lengths of the connections to be kept constant and can optionally also serve to obtain a gear ratio that is particularly useful when the bicycle has wheels of small diameter.

BRIEF DESCRIPTION OF THR DRAWINGS

Other characteristics and advantages of the invention appear on reading the following description of particular, non-limiting embodiments of the invention.

Reference is made to the accompanying drawings, in which:

FIG. 1 is a side view of a bicycle in accordance with the invention in an unfolded state;

FIG. 2 is a view analogous to FIG. 1 showing the bicycle in a semi-folded state;

FIG. 3 is a view analogous to FIG. 1 showing the bicycle in a folded state;

FIG. 4 is a fragmentary side view from the opposite side to FIG. 1 showing the bicycle in accordance with the invention in an unfolded state;

FIGS. 6 and 7 are fragmentary perspective views of a frame hinge, respectively in a closed position and in an open position, in a variant embodiment of the bicycle.

MORE DETAILED DESCRIPTION

Figure 5A:
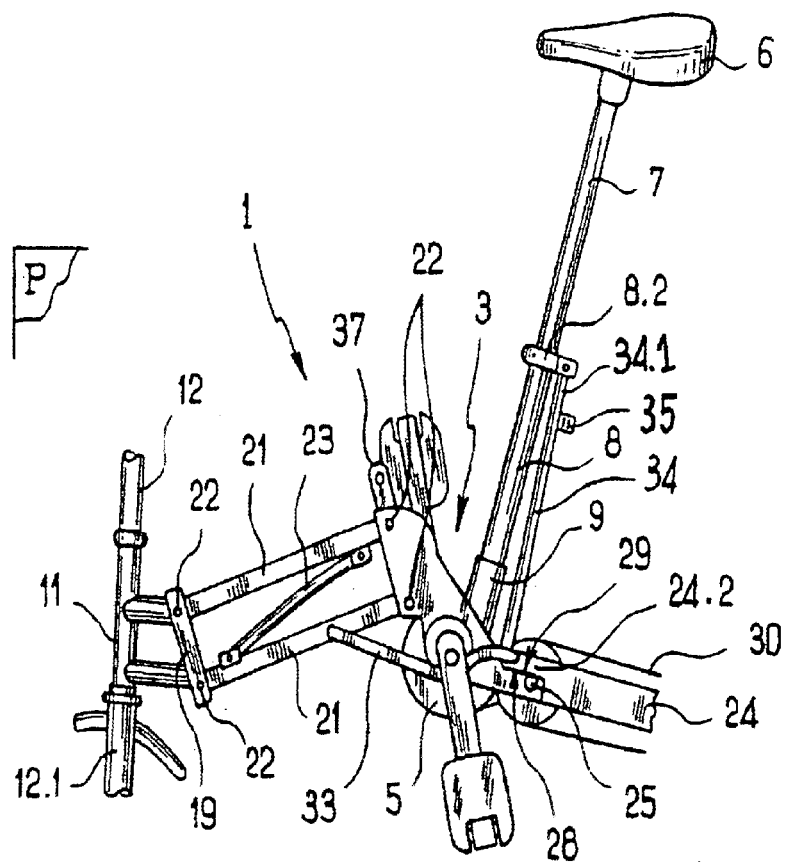
FIGS. 5a and 5b are fragmentary sectional views of the device for locking the bicycle in the unfolded position (5a), and in the semi-folded/folded position (5b), respectively.

With reference to FIGS. 1 to 5, the bicycle in accordance with the invention comprises a frame given overall reference 1, comprising a front portion 2, a central portion 3, and a rear portion 4.

The central portion 3 serves as a support for a pedal unit 5 and a seat 6.

The pedal unit 5 is rotatably mounted in conventional manner to the central portion 3 and has raisable pedals of known type. The seat 6 is fixed to one end of a seat post 7 slidably received in a sheath 8. Sliding the seat post 7 in the sheath 8 serves to match the height of the seat to users of different sizes. The position of the seat post 7 in the sheath 8 is blocked in conventional manner by clamping.

The sheath 8 possesses a bottom end 8.1 forming an abutment shoulder and a top end 8.2 likewise forming an abutment shoulder. The sheath 8 is mounted in a socket 9 secured to the central portion 3 so as to be slidable between an in-use position (shown in FIGS. 1, 2, 4, and 5.a) in which the shoulder 8.1 comes into abutment against the bottom surface 10 of the central portion 3 with the seat 6 spaced apart from the pedal unit 5, and a stowage position (shown in FIGS. 3 and 5.b) in which the shoulder 8.2 is in abutment against the top end of the socket 9 and the seat 6 is closer to the pedal unit 5.

The front portion 2 comprises a guide tube 11 pivotally receiving a steering post 12 having a bottom end 12.1 forming a fork in which a wheel 13 is mounted and a top end 8.2 on which handlebars given overall reference 14 are mounted. In this case, the handlebars 14 comprise two posts 15 with bottom ends mounted to pivot on the top end 12.2 of the steering post 12, and top ends provided with handles 16. The posts 15 are locked in position by means of a clamping knob 17. The handles 16 are preferably mounted on the posts 15 so as to be capable of pivoting thereon. The handlebars 14 also have hooks to which a bag may be secured (see FIG. 1).

The front portion 2 and the central portion 3 are connected to each other in such a manner that the seat 6, the seat post 7, the sheath 8, the socket 9, the guide tube 11, the steering post 12, the wheel 13, and the handlebars 14 extend in a common plane P. The front portion 2 is shown connected to the central portion 3 via a deformable parallelogram given overall reference 18. The deformable parallelogram 18 comprises two facing plates 19 parallel to the plane P and secured to the guide tube 11, two facing plates 20 parallel to the plane P and secured to the central portion 3, and two bars 21 extending in the plane P parallel to each other and having opposite ends fixed to the plates 19 and to the plates 20 via hinge pins 22 extending perpendicularly to the plane P between said plates. The parallelogram 18 is thus deformable between a deployed state in which the wheel 13 is in a spaced-apart position and extends beyond one end of the central portion 3 (FIG. 1), and a flat state in which the wheel 13 extends substantially beneath the pedal unit 5 (FIGS. 2 and 3).

A telescopic link 23 is fixed diagonally between the bars 21 in such a manner that said telescopic link 23 has one end fixed to the top bar 21 close to the central portion 3 and its opposite end fixed to the bottom bar 21 close to the front portion 2. The link 23 is telescopic between a retracted state in which it possesses abutment means in compression which bear against each other and in which the deformable parallelogram is in its deployed state, and a deployed state in which the abutment means of the telescopic link 23 are spaced apart from each other while the deformable parallelogram 18 is in its flat state.

Figure 5B:
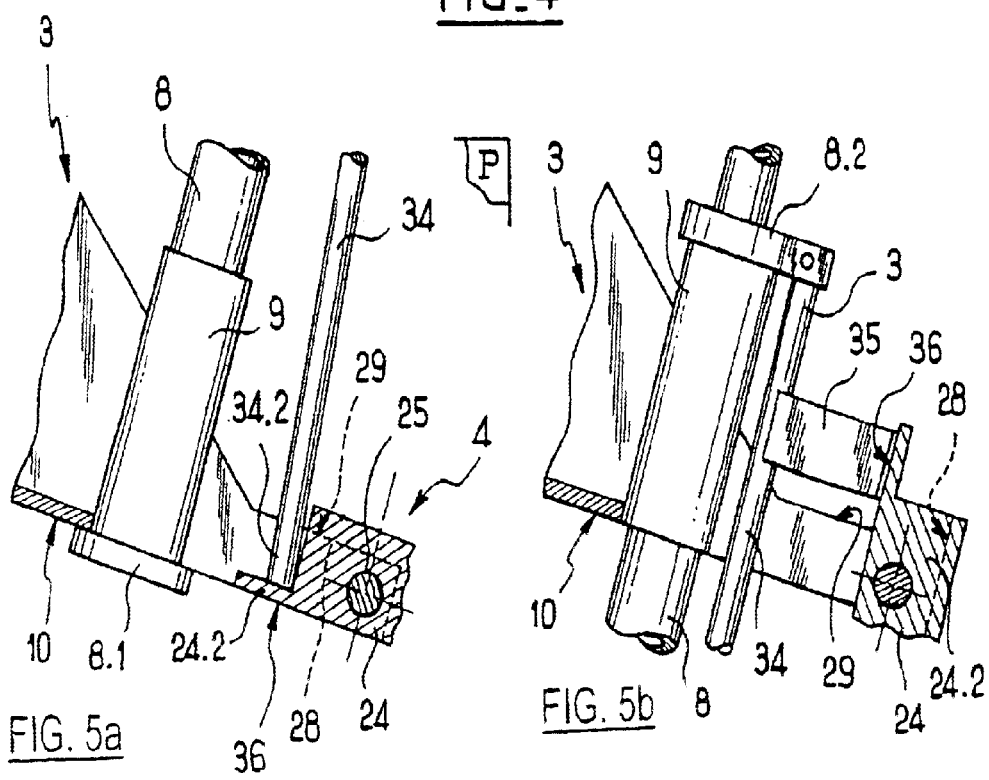

The rear portion 4 comprises an arm 24, in this case a pair of arms forming a fork, with two ends 24.1 and 24.2, and which is fixed between its two ends to the central portion 3 by means of a hinge pin 25 perpendicular to the plane P so as to be movable between a spaced-apart position in which the end 24.1 is remote from one end of the central portion 3 (FIGS. 1, 4, and 5.*a*), and a close-together position in which the end 24.1 extends beneath the central portion 3 (FIGS. 2, 3, and 5.*b*). A wheel 26 is mounted to the end 24.1 and is connected to the pedal unit 5 by means of a transmission given overall reference 27. The end 24.2 extends beyond the hinge pin 25 and has a bottom abutment surface 28 for co-operating with a top abutment surface 29 of the central portion 3 to define a spaced-apart position for the arm 24 and thus for the wheel 26.

The transmission means 27 comprises a chain 30 extending around a sprocket secured to the wheel 26 and a first chain wheel of an intermediate pair of chain wheels 31 mounted to rotate about an axis coinciding with the axis of the hinge pin 25. The second chain wheel of the intermediate pair of chain wheels 31 is connected to the chain wheel of the pedal unit 5 via a second chain 32 extending around them. Belts or other transmission means could be used instead of chains.

A synchronizing rod 33 (visible in FIG. 4) is connected to the end 24.2 of the arm 24 and to the bottom bar 21 of the deformable parallelogram 18 in such a manner as to ensure that the movements of the wheels 13 and 26 between their spaced-apart and close-together positions are coordinated.

The bicycle also has a locking rod 34 having one end 34.1 mounted on the top end 8.2 of the sheath 8 to pivot between a locked position in which, with the arm 24 being in its spaced-apart position and the sheath 8 being in its in-use position, the locking rod 34 has a free opposite end 34.2 which is spaced apart from the sheath 8 so as to bear against the second end 24.2 of the arm 24 to press the abutment surface 28 against the abutment surface 29 (see FIG. 5.*a*), and an unlocked position in which the free end is moved close to the sheath 8 and is retracted from the second end 24.2 of the arm 24 (see FIGS. 2 and 3).

A stop 35 is secured to the locking rod 34 beside its top end 34.1 in order to bear against a bottom surface 36 of the end 24.2 when the arm 24 is in its close position and the sheath 8 is in its stowage position so as to oppose movement of the arm 24 towards its spaced-apart position (see FIG. 5.*b*).

With the wheels 13 and 26 in their spaced-apart position and the sheath 8 in its in-use position, as shown in FIG. 1, the bicycle is folded by causing the locking rod 34 to pivot towards the sheath 8 so as to allow the sheath B to move down towards its stowage position, taking the locking rod 34 with it. The end 24.2 of the arm 24 is thus free.

Thereafter, the user raises the central portion 3, for example by means of a handle 37 secured thereto, thereby causing the arm 24 to pivot, bringing the wheel 26 towards its close-together position and flattening the deformable parallelogram 18, thus bringing the wheel 13 towards its close-together position. The rod 34 serves to synchronize these two movements. It should be observed that the user raises only the central portion 3, the wheels 13 and 26 continuing to provide support points for the front and rear portions 3 and 4 relative to the ground.

The user continues this upward movement until the deformable parallelogram 18 has become completely flattened and the sheath 8 has moved relative to the central portion 3 until the end shoulder 8.2 comes into abutment against the socket 9. The stop 35 then extends between the surface 36 at the end 22 of the arm 24 in its close-together position, and the rod 34 so as to constitute an abutment opposing pivoting of the arm 24 towards its spaced-apart position (FIG. 5.*b*). In order to make the bicycle easier to fold, it is possible to associate a spring with the telescopic link 23 tending to deploy the telescopic link 23 and flatten the deformable parallelogram 18.

The wheels 13 and 26 are then moved close to each other under the pedal unit 5 and constitute the only support points for the bicycle on the ground. None of the other components of the bicycle interfere with the ground or impede running of the bicycle. The bicycle is thus in the state shown in FIG. 2 where it can be pushed along beside the user so as to engage in a pedestrian area. The bicycle as folded in this way has a short wheelbase, thus keeping down the inconvenience caused by the bicycle to other pedestrians and making it easier to handle.

It is possible to further reduce the size of the bicycle, e.g. for the purpose of putting it away in a cupboard, by pushing down the seat 6, by folding the pedals of the pedal unit 5, and by bringing down the posts 15 of the handlebars 14 to the front wheel 13 so as to obtain the configuration shown in FIG. 3 which shows the bicycle at its most compact.

It will be observed that by using wheels of small diameter it is possible to reduce its wheelbase very considerably. The intermediate pair of chain wheels is then preferably arranged to compensate for the small diameter of the rear wheel so as to cause the bicycle to advance through much the same distance for one turn of the pedals as occurs when using large wheels.

The bicycle is deployed merely by raising the seat 6 so as to bring the sheath 8 into its in-use position. The stop 35 is then disengaged from the end 24.2 of the arm 24 and the arm 24 can pivot so as to bring the wheel 26 into its spaced-apart position, and because of the rod 33, the deformable parallelogram 18 is deployed so as to bring the wheel 13 into its spaced-apart position. It should be observed that the central portion 3 tends to move downwards under its own weight, thereby moving the wheels apart from each other, thus making the bicycle easier to deploy.

With the shoulder 8.1 coming into abutment against the central portion 3 and with the wheel 26 reaching its spaced-apart position, the end 24.2 of the arm 24 passes beneath the free end 34.2 of the locking rod 34 which returns to its locked position spaced apart from the sheath 8 and blocks the arm 24 in its spaced-apart position (see FIG. 1).

FIGS. 6 and 7 show a variant of the bicycle making it possible to obtain a configuration of the bicycle which is even more compact in the folded state, the deformable parallelogram 18 being connected to the guide tube 11 via a hinge given overall reference 38, which hinge has its pin offset from the plane P so as to pivot between an in-use position in which the front portion 2 is in line with the deformable parallelogram 18 and the rear portion 4, and a stowage position in which the front portion 2 is brought back beside the rear portion 4.

The hinge 38 comprises a plate 39 secured to the deformable parallelogram 18 (with the plates 19 being fixed perpendicularly to the plate 39 in this case), and a plate 40 fixed to the guide tube 11. In this case, the plates 39 and 40 are of angle cross-section and they have two adjacent edges 39.1 and 40.1 which are substantially vertical and hinged to each other.

The hinge has means enabling it to be locked both in its closed position and in its open position corresponding to the in-use position and to the stowage position.

The locking means comprise a mechanism 41 comprising two parallel arcs 42 having first ends 42.1 secured to opposite ends of the edge 40.2 of the plate 40 remote from its edge 40.1 that is pivotally mounted, and having opposite ends 42.2 between which a rod 43 is pivotally secured and forms a clamping cam having studs 44 for co-operating with setbacks in the rear face 45 of the plate 39 when the hinge 38 is in its closed position so as to force the plates 39 and 40 to bear against each other.

The rod 43 forming the clamping cam is also associated with a T-shaped drive element 46, with the free end 46.1 of the leg of the T-shape being fixed to the rod that forms the clamping cam.

In the closed position, the drive element 46 extends along the deformable parallelogram 18.

In the open position, the free end 46.2 constituted by the crossbar of the T-shape is inserted into notches 47 formed in the edges of plates 48 secured to the plate 39 and extending substantially perpendicularly to the hinge axis 38 so that the arcs 42, the clamping cam 43, and the drive element 46 form a toggle mechanism which can be pushed over center to brace the hinge in the open position.

Naturally, the invention is not limited to the embodiment described and variant embodiments can be applied thereto without going beyond the ambit of the invention as defined by the claims.

In particular, other means for reducing the wheelbase and for keeping the wheels in the same plane can be used, and in particular sliding means or means that are the result of inverting linkage relationships. Similarly, other abutment means or locking means can be provided for keeping the bicycle in its deployed, semi-folded, and folded states.

Furthermore, the bicycle can be fitted with suspension means, such as a telescopic fork for the front wheel, a shock-absorber for the rear wheel.

What is claimed is:

1. A folding bicycle comprising a frame (1) having a front portion (2) on which a steering post (12) is mounted, the steering post having a bottom end provided with a front wheel (13) and a top end provided with handlebars (14), a central portion (3) on which a seat (6) and a pedal unit (5) are mounted, and a rear portion (4) which comprises an arm (24) having a first end (24.1) on which a rear wheel (26) is mounted, the rear wheel being connected to the pedal unit (5) by transmission means (27), and an opposite, second end (24.2) connected to the central portion by a hinge (25) so that the rear wheel is movable between a spaced-apart position and a close-together position relative to the front wheel, wherein the seat is secured to a post (7) slidably received in a sheath (8) mounted on the central portion (3) to slide between an in-use position in which the seat (6) is remote from the pedal unit (5) and a shoulder surface (8.1) of the sheath is in abutment beneath the central portion, and a stowage position in which the seat is adjacent to the pedal unit, and wherein the sheath has means for locking the arm in the spaced-apart position, which means are arranged to co-operate with the second end of the arm and oppose movement of the sheath towards its stowage position when the sheath is in its in-use position.

2. A folding bicycle according to claim 1, wherein a second end of the arm has an arm abutment surface (28) beyond the hinge (25) for coming into abutment against a corresponding surface (29) of the central portion (4) to define the spaced-apart position of the rear wheel, and wherein the bicycle includes a rod (34) for locking the arm (24) in a spaced-apart position, the locking rod (34) having one end (34.1) mounted on the sheath (8) to pivot when the sheath is in its in-use position between a locked position in which a opposite end (34.2) of the locking rod bears against the second end (24.2) of the arm (24) to press the abutment surface (28) against the corresponding surface (29) of the central portion (3), and an unlocked position in which the opposite end (34.2) of the locking rod is retracted relative to the second end (24.2) of the arm (24).

3. A folding bicycle according to claim 1, wherein the locking rod (34) is provided at its end (34.1) mounted on the sheath (8) with a stop (35) for co-operating with the second end (24.2) of the arm (24) when the sheath is in its stowage position and the arm is in a close-together position, so as to oppose displacement of the arm towards its spaced-apart position.

4. A folding bicycle according to claim 1, wherein the front portion (2) and the central portion (3) of the frame (1) are connected together by a deformable parallelogram (18) having hinges (22) with axes substantially perpendicular to a plane (P) containing the bicycle in an unfolded state, and the hinge (25) has an axis substantially perpendicular to said plane in such a manner that the wheels (13, 26) are movable relative to each other between a spaced-apart position corresponding to the bicycle being in its unfolded state, and a close-together position beneath the pedal unit (5) corresponding to the bicycle being in a folded state.

5. A folding bicycle according to claim 4, including a synchronizing rod (33) for synchronizing movements of the front and rear portions (2 and 4), the synchronizing rod having one end fixed to the deformable parallelogram (18), and one end fixed to the second end (24.2) of the arm (24).

6. A folding bicycle according to claim 4, including a link (23) extending between two opposite sides (21) of the deformable parallelogram (18), the link being telescopic between a retracted state corresponding to the front wheel (13) being in its spaced-apart position, and a deployed state corresponding to the front wheel being in the close-together position.

7. A folding bicycle according to claim 6, wherein the link (23) of the deformable parallelogram (18) is associated with a spring providing assistance in deploying the link.

8. A folding bicycle according to claim 4, wherein the front portion (2) is connected to the deformable parallelogram (18) by a hinge (38) having an axis offset from said plane and substantially vertical so as to pivot between an in-use position in which the front portion is in line with the deformable parallelogram (18) and a folded position in which the front portion (2) is brought back beside the rear portion (4), and wherein the hinge (39) includes means for locking the hinge in each of its positions.

9. A folding bicycle according to claim 8, wherein the hinge comprises first and second plates (39, 40) having adjacent edges (39.1, 40.1) hinged to each other, one of the plates (39) being secured to the deformable parallelogram (18) and the other plate (40) being secured to the front portion (2), and wherein the locking means comprise a mechanism (41) having one end (42.1) mounted to pivot on a free edge (40.2) opposite from the hinged edge (40.1) of the first plate (40) and an opposite end (42.2) connected to a cam (43) for clamping the mechanism against a rear face (45) of the second plate when the hinge is in its in-use position and wherein the clamping cam (43) is associated at one end (46.1) with a drive rod (46) having an opposite end (46.2) arranged to co-operate with the second plate when the hinge is in its folded position in such a manner that the mechanism and the clamping cam drive rod form an over-center toggle mechanism for bracing the hinge in the folded position.

10. A folding bicycle according to claim 1, wherein the transmission means include an intermediate pair of chain wheels (31) mounted to rotate about a hinge axis (25) between the rear portion (4) and the central portion (3) of the frame (1), and connected both to the pedal unit (5) to be driven thereby, and to the rear wheel (26) in order to drive it.

* * * * *